United States Patent
Bergmeister et al.

(10) Patent No.: US 6,657,023 B2
(45) Date of Patent: *Dec. 2, 2003

(54) POLYMERIZATION PROCESS

(75) Inventors: Joseph J. Bergmeister, Bartlesville, OK (US); Steven J. Secora, Bartlesville, OK (US); Gerhard K. Guenther, Kemah, TX (US); Elizabeth A. Benham, Bartlesville, OK (US); Max P. McDaniel, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 154 days.

This patent is subject to a terminal disclaimer.

(21) Appl. No.: 09/773,296

(22) Filed: Jan. 31, 2001

(65) Prior Publication Data

US 2001/0007894 A1 Jul. 12, 2001

Related U.S. Application Data

(62) Division of application No. 09/213,884, filed on Dec. 17, 1998, now Pat. No. 6,204,346.

(51) Int. Cl.[7] ................................................. C08F 4/22

(52) U.S. Cl. ........................ 526/104; 526/348; 526/352; 526/106; 526/129; 526/131

(58) Field of Search ................................. 526/348, 352, 526/104, 106, 129, 131

(56) References Cited

U.S. PATENT DOCUMENTS

| | | |
|---|---|---|
| 4,188,471 A | 2/1980 | Nasser, Jr. et al. |
| 5,426,082 A | 6/1995 | Marsden |
| 5,508,362 A | 4/1996 | Rollmann et al. |
| 5,599,887 A * | 2/1997 | Badley et al. ............... 526/105 |
| 6,201,077 B1 * | 3/2001 | Bergmeister et al. ....... 526/104 |
| 6,204,346 B1 * | 3/2001 | Bergmeister et al. ....... 526/104 |

FOREIGN PATENT DOCUMENTS

EP  0 352 715 A   1/1990

* cited by examiner

*Primary Examiner*—Ling-Siu Choi
(74) *Attorney, Agent, or Firm*—Kilpatrick Stockton LP

(57) ABSTRACT

Polymerization processes for ethylene and at least one mono-1-olefin comonomer having from about three to eight carbon atoms per molecule in the presence of a twice-aged catalyst system comprising chromium supported on a silica-titania support and a trialkylboron compound is provided. Novel ethylene copolymers also are produced.

11 Claims, No Drawings

POLYMERIZATION PROCESS

This application is a division of application Ser. No. 09/213,884, filed Dec. 17, 1998, now U.S. Pat. No. 6,204,346.

BACKGROUND OF THE INVENTION

This invention relates to the polymerization and copolymerization of a mono-1-olefin monomer, such as ethylene, with a higher alpha-olefin comonomer.

Supported chromium catalysts long have been a dominant factor in the production of high density olefin polymers, such as polyethylene. As originally commercialized, these catalyst systems were used in solution polymerization processes. However, it became evident early that a slurry process was a more economical route to many commercial grades of olefin polymers, that is, a polymerization process carried out at a temperature low enough that the resulting polymer is largely insoluble in the diluent.

It is well known that mono-1-olefins, such as ethylene, can be polymerized with catalyst systems employing vanadium, chromium or other metals on a support, such as alumina, silica, aluminum phosphate, titania, zirconium, magnesium and other refractory metal supports. Initially, such catalyst systems primarily were used to form homopolymers of ethylene. Soon copolymers were developed wherein comonomers such as propylene, 1-butene, 1-hexene or other higher mono-1-olefins were copolymerized with ethylene to provide resins tailored to specific end uses.

Often, high density and/or high molecular weight copolymers can be used for blow molding applications because the blow molding process enables rapid processing into a desired molded product. Theoretically, any type of resin can be made to flow more easily by merely lowering the molecular weight, (i.e., by raising the melt index.) However, this is rarely practical because of other penalties that occur because of a higher melt index (MI). A higher melt index can result in a decrease in melt strength, which can cause a parison to tear or sag during extrusion because the parison is unable to resist its own weight. As used in this disclosure, a parison is an extruded cylinder of molten polymer before it is blown by air pressure to fill a mold. Additionally, a higher MI can cause bottle properties such as environmental stress crack resistance (ESCR) and impact strength to decrease. One of the most prevalent problems associated with raising the MI is an increase of the amount of swell exhibited by the resin as it exits the die.

Two kinds of swell are critical during blow molding. These are "weight swell" and "diameter swell"; the later also is referred to herein as "die swell". As polymer, or resin, is extruded under pressure through a die opening and into a mold, a polymer has a tendency to swell as it exits the die. This is known as weight swell and is determinative of the thickness of bottle wall, as well as the overall weight of the resultant blow molded product. For example, a resin which is extruded through a 0.02 inch die gap might yield a bottle wall thickness of 0.06 inches, in which case the weight swell is said to be 300%. A resin that swells too much can produce a bottle with too thick of a wall. To compensate, the die opening or gap can be narrowed by manual adjustment. However, any decrease in die gap can increase the resistance to the flow of the resin through the die. Narrower die gaps can result in higher shear rates during extrusion which also can increase in melt fracture leading to a rough bottle surface. Thus, a resin which can be described as easily processable must exhibit low weight swell, which allows a wide die gap.

Diameter, or die, swell refers to how much the parison flares out as it is extruded from the die. For example, a resin extruded through a circular die of one (1) inch diameter can yield a parison tube of 1.5 inches in diameter; the die swell is said to be 50%. Die swell is significant because molds usually are designed for a certain amount of flare; too much die swell can interfere with molding of a bottle handle. A high degree of weight swell often causes high die swell because of the narrow gap that accompanies it. Unfortunately, increasing the melt index of a resin usually increases both weight swell and die swell of the polymer. Thus, as used herein, a resin which is considered easily processable also should exhibit low die swell.

SUMMARY OF THE INVENTION

Therefore, it is an object of this invention to provide an improved olefin polymerization process.

It is another object of this invention to provide a process to produce copolymers of ethylene and mono-1-olefins that can be processed at increased production rates and have a decreased weight swell.

It is still another object of this invention to provide a process to produce copolymers of ethylene and mono-1-olefins that can be processed at increased production rates and have a decreased die swell.

In accordance with this invention, herein is provided a polymerization process comprising contacting under slurry polymerization conditions at a temperature within a range of about 200° F. to about 226° F. (about 93° C. to about 108° C.) in an isobutane diluent:

a) ethylene monomer;

b) at least 1 mono-1-olefin comonomer having about three to eight carbon atoms per molecule;

c) a catalyst system comprising chromium supported on a silica-titania support, wherein said support comprises from about 1 to about 10 weight percent titanium, based on the weight on the support, wherein said catalyst system has a pore volume within a range of about 0.5 to about 1.3 ml/g, a surface area within a range about 150 to 400 m$^2$/g, and said catalyst system has been activated at a temperature within a range of about 800° F. to about 1300° F. (about 427° C. to about 704° C.);

d) a trialkylboron compound; and e) recovering an ethylene/mono-1-olefin copolymer.

In accordance with another embodiment of this invention, a copolymer comprising ethylene and a mono-1-olefin having from about 3 to about 8 carbon atoms carbon atoms per molecule is provided, wherein said copolymer has a high load melt index (HLMI) within a range of about 10 to about 80 g/10 minutes, a density within a range of about 0.95 to 0.96 g/cc, a weight swell lower than about 380%, and a die swell lower than about 43%. An environmental stress crack resistance (ESCR) of greater than about 200 hours, a $M_w/M_n$ of greater than about 12 and the onset of melt fracture of greater than about 2000 sec$^{-1}$.

DESCRIPTION OF THE PREFERRED EMBODIMENTS

Catalyst

As used in the description herein, the terms "cogel" and "cogel hydrogel" are arbitrarily used to describe cogelled silica and titania. The term "tergel" is used to describe the product resulting from gelation together of silica, titania, and chromia. References to "silica" mean a silica-containing material generally comprised of 80 to 100 weight percent silica, the remainder, if any, being selected from alumina, boria, magnesia, thoria, zirconia, or mixtures thereof. Other ingredients which do not adversely affect the catalyst or which are present to produce some unrelated results also can be present.

The support for the catalyst of this invention must be a cogel of silica and a titanium compound. Such a cogel hydrogel can be produced by contacting an alkali metal silicate such as sodium silicate with such as an acid, carbon dioxide, or an acidic salt. The preferred procedure is to utilize sodium silicate and an acid such as sulfuric acid, hydrochloric acid, or acetic acid, with sulfuric acid being the most preferred due to less corrosivity and greater acid strength. The titanium component must be coprecipitated with silica and thus most conveniently the titanium compound will be dissolved in the acid or alkali metal silicate solution.

The titanium compound preferably is incorporated with the acid. The titanium compound can be incorporated in the acid in any form in which it will be subsequently incorporated in the silica gel formed on combination of the silicate and the acid (preferably by means of adding the silicate to the acid) and from which form it is subsequently convertible to titanium oxide on calcination. Suitable titanium compounds include, but are not limited to, halides such as $TiCl_3$ and $TiCl_4$, nitrates, sulfates, oxalates and alkyl titanates. In instances where carbon dioxide is used, the titanium, of course, must be incorporated into the alkali metal silicate itself. Also with acidic salts it is preferred to incorporate the titanium compound in the alkali metal silicate and in such instances, preferred titanium compounds are water soluble materials which do not precipitate the silicate, i.e. are those convertible to titanium oxide on calcination such as, for example, $K_2TiO(C_2O_4)_2H_2O$ (titanium potassium oxalate); $(NH_4)_2TiO(C_2O_4)_2H_2O$ and $Ti_2(C_2O_4)_3H_2O$.

The titanium compound preferably is present in an amount within the range of about 1 to about 10, preferably about 1 to about 8, and most preferably about 2 to about 8 weight percent, calculated as titanium, based on the weight of the cogel. The preferred titanium ranges result in a catalyst system that can have improved activity and a higher melt index polymer.

The catalyst of this invention must contain a chromium compound. The chromium compound can be incorporated in any of several separate ways. First, a tergel can be prepared wherein the chromium compound, as well as a titanium compound, is dissolved in the acidic material or the silicate and thus coprecipitated with the silica. A suitable chromium-containing compound for use in this embodiment, for example, is chromic sulfate.

Another method to incorporate a chromium compound into the catalyst, is to use a hydrocarbon solution of a chromium compound convertible to chromium oxide to impregnate the support after it is spray dried or azeotrope dried (i.e., the xerogel). Exemplary of such materials are tert-butyl chromate, chromium acetylacetonate, and the like. Suitable solvents include, but are not limited to, pentane, hexane, benzene, and the like. Surprisingly, an aqueous solution of a chromium compound simply can be physically mixed with the support.

The catalyst system used in the invention must be aged twice, first at a substantially neutral pH and second at an alkaline pH. This twice-aged process is disclosed in U.S. Pat. No. 4,981,831, herein incorporated by reference.

Chromium preferably is present in an amount within a range of about 0.8 to about 3 weight percent, more preferably within a range of about 1.5 to about 2.5 weight percent chromium calculated as $CrO_3$, based on the total weight of the catalyst (support plus chromium compound). These ranges of chromium content provide a catalyst system that is execellent in activity.

Optionally a pore perserving agent can be added during catalyst system preparation, as disclosed in U.S. Pat. No. 4,981,831, herein incorporated by reference.

The resulting twice-aged catalyst system can be dried in any manner known in the art, such as oven drying, spray drying, azeotrope drying, or any other method.

The dried catalyst system then must be calcined. Calcination can take place by heating the dried catalyst system in the presence of an excess of molecular oxygen at a temperature within a range of about 800° F. to about 1300° F. (about 427° C. to about 704° C.), preferably about 900° F. to 1200° F. (about 482° C. to about 649° C.). Most preferably, the catalyst system calcined at a temperature within a range of about 1100° F. to about 1200° F. (about 593° C. to about 649° C.) for about 30 minutes to about 50 hours, more preferably for about 2 to about 10 hours. This calcination procedure results in at least a substanial portion of the chromium in a low valence state to be converted to a hexavalent form. Preferably, this calcination is carried out in a stream of fluidizing air wherein the stream of fluidizing air is contained as the material is cooled.

In order to achieve the desired resultant effects on the resin product, or polymer, the catalyst system must have a low pore volume, usually about 0.5 ml/g to about 1.3 ml/g, preferably about 0.8 ml/g to about 1.2 ml/g. Additionally, the catalyst system must have a low surface area, usually within a range of about 150 $m^2$/g to about 400 $m^2$/g, preferably within a range of about 200 $m^2$/g to 380 $m^2$/g. Most preferably the catalyst system surface area is within the range of 250 $m^2$/g to 350 $m^2$/g.

Catalyst systems of this invention must be used with a cocatalyst. The cocatalyst must be a trialkylboron compound wherein each alkyl group has from about 1 to about 10 carbon atoms, preferably about 2 to about 4 carbon atoms per group. Trialkylboron compounds must be used as a cocatalyst because the compounds are effective agents to improve polymer properties, such as, for example to decrease die swell and to decrease weight swell. By far, the most preferred cocatlyst is triethylboron.

The cocatalyst is used in an amount within a range of about 1 to about 6 parts per million (ppm), or milligram per kilogram (mg/kg), based on the amount of diluent in the reactor. Preferably the cocatalyst is used in an amount within a range of about 2 to about 4 ppm, for cost effectiveness, best polymer properties, and decreasing the amount of smoke resulting from the resin during processing.

Reactants

Catalyst systems of this invention can be used to polymerize at least one mono-1-olefin containing about 2 to about 8 carbon atoms per molecule, preferably ethylene, propylene, 1-butene, 1-pentene, 1-hexene, 4-methyl-1-pentene, and 1-octene. The invention is of particular applicability in producing ethylene homopolymers and copolymers from mixtures of ethylene and about 0.5 to about 20 mole percent of one or more comonomers selected from the group consisting of alpha-olefins containing about 3 to about 8 carbon atoms per molecule. Exemplary comonomers include aliphatic 1-olefins, such as propylene, 1-butene, 1-pentene, 1-hexene, 4-methyl-1-pentene, 1-octene and other olefins and conjugated or non-conjugated diolefins such as 1,3-butadiene, 1,4-pentadiene, 1,5-hexadiene, and other such diolefins and mixtures thereof. Ethylene copolymers preferably constitute at least about 90, preferably 97 to 99.8 mole percent polymerized ethylene units. With ethylene/1-hexene copolymers, about 98 to 99.8 mole percent ethylene is preferred, the remainder of course being comonomer. Propylene, 1-butene, 1-pentene, 1-hexene and 1-octene are especially preferred comonomers for use with ethylene.

Polymerization

Catalyst systems of this invention must used in slurry polymerization processes. A slurry, or particle form, process generally is carried out in an inert diluent (medium). The diluent useful in the practice of this invention must be isobutane. While other diluents are known, or even can be used, other diluents will not result in the decreased die swell and decreased weight swell as disclosed in this invention.

The temperature of the slurry reactor must be within a range of 200° F. to 225° F. (93° C. to 107° C.). Temperatures outside of that range will not result in a polymer having the required resultant properties. Pressures in the particle form process can vary from about 110 to about 700 psi (0.76 to 4.8 MPa) or higher.

The catalyst system is kept in suspension and is contacted with the monomer(s) at sufficient pressure to maintain the isobutane and at least a portion of the monomer(s) in a liquid phase. The isobutane and temperature thus are selected such that the polymer is produced as solid particles and is recovered in that form. Catalyst system concentrations can be such that the catalyst content ranges from about 0.001 to about 1 weight percent, based on the weight of the reactor contents.

Hydrogen can be added to the slurry polymerization to control molecular weight, as is known in the prior art. When used, hydrogen generally is used at concentrations up to about 2 mole percent of the reaction mixture, preferably within a range of about 0.1 to about 1 mole percent of reaction mixture.

Product

Polymers produced in accordance with this invention must be a copolymer of ethylene and at least one higher alpha-olefin. The comonomer, or higher alpha-olefin, is present in the polymerization reactor in an amount within a range of about 0 to about 1.0 mole percent.

Copolymers produced according to this invention have a reduced die swell and a reduced weight swell as compared to conventionally prepared polyethylene copolymer resins. The polymer, or resin product, generally has a density within a range of about 0.95 to about 0.96 g/cc, preferably within a range of about 0.952 to about 0.958 g/cc. Most preferably polymer product density is within a range of 0.954 to 0.956 g/cc. The HLMI of the resultant polymer generally is within a range of about 10 to about 80 g/10 minutes, preferably about 13 to about 40 g/10 minutes. Most preferably, the HLMI is within a range of 15 to 30 g/10 minutes. The sheer response, or HLMI/MI ratio, is within a range of about 100 to about 250, preferably within a range of about 110 to about 200. Most preferably, the HLMI/MI ratio is within a range of 125 to 175.

Polymers produced in accordance with this invention also have a broad molecular weight distribution, as evidenced by the ratio of $M_w/M_n$. Usually, $M_w/M_n$, wherein $M_w$ is the weight average molecular weight and $M_n$ is the number average molecular weight, is within a range of about 10 to about 30, preferably within a range of about 12 to about 25. Most preferably, the $M_w/M_n$ is within a range of 15 to 22.

The ESCR of products produced from this resin is greater than about 200 hours, preferably greater than about 500 hours based on testing under Condition A. Most preferably, the ESCR is within a range of about 1000 hours to about 10,000 hours. Further, the resin exhibits low weight swell, which is lower than typical standard blow molding resin such as Phillips Marlex® polyethylene HHM 5502 or Phillips Marlex® polyethylene HHM 5202 under Uniloy blow molding conditions. Further, resins produced in accordance with this invention, have a low die swell, which is at least lower than typical standard blow molding resin such as Phillips Marlex® HM 5502 or Phillips Marlex® HHM 5202 under Uniloy blow molding conditions.

The normalized die swell of polymers produced in accordance with this invention usually is less than about 0.95, preferably less than 0.90. Most preferably, the normalized die swell of polymers produced in accordance with this invention is less than 0.85 for best polymer process throughput.

The onset of melt fracture for polymers produced in accordance with this invention is greater than about 2000 $sec^{-1}$, preferably greater than 2200 $sec^{-1}$. Most preferably, the onset of melt fracture for polymers produced in accordance with this invention is greater than 2300 $sec^{-1}$ for best polymer processing throughput.

Another way to distinguish polymer products produced from this resin is to compare them to currently commercially available ethylene polymers. For example, relative to a Phillips Petroleum MARLEX® 5502 polyethylene resin, polymers of the present invention generally have a HLMI less than 90% of the typical values for MARLEX® 5502, a HLMI/MI ratio of greater than 110% of the standard values for MARLEX® 5502, a $M_w/M_n$ of greater than about 110% of typical values for MARLEX® 5502. Additionally, die swell and weight swell of the resins produced in accordance with the present invention are lower than typical values for 5502. The normalized die swell of the inventive resin is generally less than 95% of the normalized typical die swell values for MARLEX® 5502 and the weight swell of the inventive resin is less than about 90% of standard or typical values for MARLEX® 5502. However, density of the inventive resin is within the standard ranges of 5502. In addition, the ESCR of the inventive resin is more than two times typical ESCR values for 5502.

The following examples are provided to further assist a person skilled in the art with understanding the invention. The particular reactants, conditions, and other variables are intended to be generally illustrative of these inventions and are not meant to be construed to be unduly limiting the reasonable scope of the invention.

EXAMPLES

Ethylene and higher alpha-olefin copolymers were prepared under continuous particle form process conditions, comprising contacting catalyst system with monomers, employing a liquid full, 15.2 cm diameter, loop reactor, having a volume of 23 gallons (87 liters), isobutane as the diluent, and occasionally some hydrogen, as shown in the following Examples.

Ethylene that had been dried over alumina was used as the monomer. Isobutane that had been degassed by fractionation and dried over alumina was used as the diluent. Triethylboron or triethylaluminum was also sometimes used as a cocatalyst as indicated in the tables below.

The catalyst used for the production of the inventive resins was a low porosity Cr/silica-titania commercially available from W.R. Grace Company as 965 Sylopore. It contained 2.5, 3.5, or 5.0 weight percent titanium as indicated and originally 1.0 weight percent chromium. In some cases, however, extra chromium was added through impregnation of a 0.5% methanol solution of chromium nitrate, as indicated in the tables. Sylopore has a pore volume of about 1.0 cc/g and a surface area of usually about 350 m2/g. Specific measurements may be shown in the tables that follow.

Control resins were made from three other types of commercial catalysts from W.R. Grace. The catalyst 969MS (sometimes also referred to as 1%Cr on Grade 952 silica) has a pore volume of about 1.6 cc/g and a surface area around 300 m2/g. Other control resins were made from 963 and 964 Magnapore which contained 1.0 weight percent chromium on a high porosity silica-titania containing either 2.5 or 5.0 weight percent titanium, as indicated. This catalyst had a pore volume around 2.4 cc/g and a surface area around 520 m2/g. Still other control resins were made by a catalyst described as Cr on HPVSA silica. This silica was also made by W.R. Grace and had a surface area of about 580 m2/g and a pore volume of about 2.2 cc/g. The reactor was operated to have a residence time of 1.25 hrs. To control polymer molecular weight and swelling, the reactor temperature was varied over the range of 200° F. to 226° F. (93° C. to 108° C.), depending on the reaction run, unless shown differently, and the pressure was 3.7 MPa (530 psi). At steady state conditions, the isobutane feed rate was 54 lbs/hr, the ethylene feed rate was about 24 lbs/hr, and the 1-hexene comonomer feed rate was varied to control the density of the product polymer.

Polymer was removed from the reactor at the rate of about 22 lbs per hour and recovered in a flash chamber. A Vulcan dryer was used to dry the polymer under nitrogen at about 60–80 degrees C. Polymer was recovered from each run and tested according to the procedures described below.

Polymer resins obtained by this invention are useful for blow molding applications. In these examples blow molding evaluations were conducted by blowing a one gallon (105.0+ 0.5 gm) bottle on a Uniloy 2016 single head blow molding machine using a 2.5 inch diameter die, 20 degree diverging die, 32% accumulator position, 8.5 second blow time, 0.10 second blow delay, 0.75 second pre-blow delay and a 45 degree F. mold temperature. A reciprocating screw speed of 45 rpm was used, providing parison extrusion at shear rates greater than 10,000/sec through the die.

Density (g/ml): ASTM D 1505-68 and ASTM D 1928, Condition C. Determined on a compression molded sample, cooled at about 15° C. per minute, and conditioned at room temperature for about 40 hours.

High Load Melt Index (HLMI)(g/10 min): ASTM D1238, condition E. Determined at 190° C. with a 21,600 gram weight.

Molecular Weight Distribution $M_w/M_n$: Molecular weights and molecular weight distributions were obtained using a Waters 150 CV gel permeation chromatograph with trichlorobenzene (TCB) as the solvent, with a flow rate of 1 mL/minute at a temperature of 140° C. BHT (2,6-di-tert-butyl-4-methylphenol) at a concentration of 1.0 g/L was used as a stabilizer in the TCB. An injection volume of 220 µL was used with a nominal polymer concentration of 0.3 g/l (at room temperature). Dissolution of the sample in stabilized TCB was carried out by heating at 160–170° C. for 20 hours with occasional, gentle agitation. The column was two Waters HT-6E columns (7.8×300 mm). The columns were calibrated with a broad linear polyethylene standard (Phillips Marlex® BHB 5003) for which the molecular weight had been determined.

Surface Area and Pore Volume: A "Quantachrome Autosorb-6 Nitrogen Pore Size Distribution Instrument" was used to determined the surface area and pore volume of the supports. This instrument was acquired from the Quantachrome Corporation, Syosset, N.Y.

Weight Swell (%): Percent weight swell measures the amount the molten resin expands immediately as it exits the die. It is a measure of the "memory" of the polymer chains as they seek to relax and thus reform the polymer shape. Weight swell is an important parameter as it determines how tight the die gap must be adjusted to provide a constant bottle weight. If a resin has high weight swell, the die gap required will be tighter to make the proper part weight. In so doing, it will require higher stress to push the resin through the die than a lower weight swell resin. Weight swell is defined as the ratio of the die gap to the final bottle wall thickness.

Diameter (Die) Swell: Another measurement of swell is die swell or diameter swell. This is the ratio of the parison diameter to the die diameter. Another way of expressing die swell is to reference this number to the standard commercial blow molding polyethylene resin, MARLEX 5502, obtained from Phillips Petroleum Company. This value, called the normalized die swell, is obtained by dividing the die swell of the resin by the die swell of MARLEX 5502 measured on the same occasion, on the same machine, and under the same machine conditions.

Bottle Stress Crack Resistance (hrs): Bottle stress crack resistance was tested using ten 105 gram one gallon bottles made as described about on a Uniloy 2016 machine. The bottles were filled with a 10% Orvus-K detergent solution, capped, and placed in a 140 degree F. hot room. Bottle failures were noted each day, and a 50% mean failure time was calculated for each set.

Onset Of Melt Fracture ($sec^{-1}$): Extruder-capillary die melt fracture results were obtained using a 1 inch Killion single screw extruder (KL-100) fitted with a barrier screw. Capillary dies were attached to the end of the extruder with an adaptor. The adaptor was fitted with a Dynisco pressure transducer (model TPT432A) with a measurement range of 0–5000 psi, which was located just upstream of the entry to the capillary die. A two-piece capillary die was used. The first section consisted of a detachable orifice (entry angle 90 degrees and zero land length) with an entry diameter of 1 inch and a exit diameter of 0.15 inches. The second section consisted of a capillary with a 0.150 inch diameter and 2.25 inch land length (L/D=15).

A typical experiment would consist of extruding a polymer over a range of low rates (screw RPM) using extruder, adapter, and die temperature setting of 170 C. Using the capillary die (described earlier) fitted to the orifice die, the pressure in the adapter, flow rate at various RPM were noted along with the RPM at which the onset of melt fracture occurred. Pressure drop versus flow rate data was also collected using the orifice die alone. Using standard calculations for flow through capillary dies, this data was then converted to true shear stress versus shear rate for each resin examined.

Example 1

The Table I below shows the characteristics of two resins, wherein Run 101 is considered an optimum of the present invention, and Run 102 is considered a resin typical of commercial blow molding resins such as Phillips Marlex® HHM 5502. Both Runs were made under similar conditions and analyzed.

Notice, under the "Blow Molding Data" section of Table I that both the weight swell and the die swell of Run 101 are considerably lower than for Run 102. Actually, Run 102 already is considered to be a low die swell resin compared to many existing resins or catalyst systems available. Notice that Run 101 was processed at a larger die gap than Run 102, which is indicative of its lower weight swell. The wider die gap thus permitted Run 101 to be processed with less head pressure and at a considerably lower shear rate (about 10,000 vs. 20,000). These characteristics justify the label of "easy processing resin."

Notice also under the "Resin Data" section of Table I that the above advantages were accomplished at a higher, not lower, molecular weight, as indicated by the $M_w$ data and the HLMI values. Thus, Run 101 could be made still more easy to process by lowering the molecular weight to be closer to that of Run 102. Of course, die swell would increase, but since the die swell of Run 101 is already lower than Run 102, this could be done.

The reason the invention resin could be easily processed, even at higher molecular weight, is due in part to its broader $M_w$ data distribution, as evidenced by the $M_w/M_n$ and the HLMI/MI. Both these values are considerably higher for Run 101 than for Run 102, indicating greater ease of flow. The higher HLMI/MI of Run 101 also indicates higher melt strength, which is needed if the molecular weight is to be decreased beyond the Run 102 value. Melt strength is the property that allows the parison to resist sagging from its own weight before being blown into a bottle.

Activation energy, Ea, is an indication of the degree of long chain branching of the resin. In general, a high Ea imparts lower weight and die swells and also gives the resin more melt strength. Notice that Run 101 displays a higher Ea then Run 102.

Notice also in Table I that Run 101 boasts generally equal or better physical properties than Run 102, as evidenced by the ESCR-A, ESCR modified B, bottle ESCR and bottle impact data. All this was accomplished at a slightly higher density than Run 102, which would normally penalize these properties.

Another characteristic of Run 101 is the tendency to melt fracture, or ripple, giving a rough surface on the bottle. "Melt Fracture Onset" data in Table I is a measure of the maximum shear rate that the resin can take before it begins to melt fracture. Notice that Run 101 generally can tolerate equal or higher shear rates than Run 102, and that this is done at lower die pressure. However, because Run 101 has a lower weight swell, which permits a wider die gap, there is usually no need to process the resins at the same shear rates. Run 101 enjoys the advantage.

"Production Data" in Table I shows that Run 101 also enjoys other advantages. The productivity of the catalyst system used for Run 101 is considerably higher than Run 102 catalyst system, despite the slightly lower ethylene concentration, and the much lower activation temperature, both of which normally penalize productivity.

Finally, "Subjective Blow Molding Observations" rated various aspects of the operations on a subjective 1 to 5 scale wherein 1 is a good rating and 5 is a poor rating, as observed by the blow molding operator. These ratings are purely judgmental by the operator, but they are done blindly, without bias. Run 101 generally processes similar results to Run 102 in these tests, as shown by the ratings in Example I and II. The one negative observation in Example I, odor, was not confirmed in subsequent tests in Example II, and can thus be dismissed as an anomaly.

TABLE I

| Run | 101 | 102 |
|---|---|---|
| Production Data | | |
| Catalyst Type | 2% Cr Sylopore | 1% Cr/952 Silica |
| Titanium, wt % | 3.5 | 0 |
| Surface Area, m$^2$/g | 320 | 280 |
| Pore Volume, ml/g | 1.03 | 1.50 |
| Activation Temperature, °F. | 1100 | 1450 |
| Cocatalyst | TEB | None |
| Cocatalyst Concentration, ppm | 2.0 | 0.0 |
| Productivity g pol/g cat/hr | 4000 | 2174 |
| Reactor Temp, °F. | 216 | 214 |
| Ethylene, mol % | 8.43 | 9.45 |
| Resin Data | | |
| HLMI, g/10 mins | 19.40 | 30.02 |
| HLMI/MI | 216 | 100 |
| Density, g/cc | 0.9552 | 0.9533 |
| $M_w$ (× 10$^{-3}$) | 226.1 | 165.9 |
| $M_n$ (× 10$^{-3}$) | 9.37 | 19.80 |
| Mw/Mn | 24.10 | 8.36 |
| Ea, kJ/mol | 37.91 | 33.89 |
| ESCR-A, hours | 283 | 115 |
| ESCR-modified B, hours | 115 | 115 |
| Melt Fracture Onset | | |
| Shear Rate, sec$^{-1}$ | 2360 | 1929 |
| Die Pressure, psi | 1390 | 1500 |
| Blow Molding Data | | |
| Weight Swell, % | 290 | 399 |
| Die Swell, % | 34.5 | 42.9 |
| Head Press., psi | 4800 | 5460 |
| Shear Rate, sec$^{-1}$ | 9993 | 19683 |
| Die Gap, inches | 0.0208 | 0.0168 |
| Subjective Blow Molding Observations 1 to 5 (1 = good, 5 = poor) | | |
| Smoke | 3 | 3 |
| Surface | 3 | 2 |
| Ease of Processing | 3 | 2 |
| Odor | 5 | 3 |
| Bottle Properties | | |
| ESCR, hours | <700 | 372 |
| Dart Impact, ft | 11.5 | <12 |

Example 2

Table II lists another series of runs, this time made with less TEB in the reactor and less chromium on the catalyst system. The same characteristics that distinguished Run 101 in Example I also are evident here. Notice that invention Runs 201 and 202 exhibit considerably lower die and weight swells, and that they could be processed at generally wider die gaps in this Example. This in turn permits Runs 201 and 202 to be processed at much lower shear rates. Again this indicates an "easy processing resin" despite the generally higher molecular weight of Runs 201 and 202.

Notice also in Example II that Runs 201 and 202 begin to melt fracture at about the same point as Runs 203–207, which because of the wider die gap, gives Runs 201 and Run 202 a considerably advantage in processing.

Notice also that the bottle properties (ESCR) of Runs 201 and 202 are considerably improved over control Runs 203–207.

The productivity of the catalyst system in invention Runs 201 and 202 is much better than control Runs 203–207, despite the lower activation temperature.

The breadth of the molecular weight distribution is increased in Runs 201 and 202, as determined by $M_w/M_n$ values, and the shear response (HLMI/MI) also is increased which indicates the superior melt strength of Runs 201 and 202. Ea also is higher, indicating a higher level of long chain branching for Runs 201 and 202. Other process ratings are roughly equivalent for all Runs.

the molecular weight distribution is narrowed, as indicated by $M_w/M_n$ and by HLMI/MI. Die swell also increased slightly, catalyst productivity decreased, the onset of melt fracture declined to much lower shear rates, and the ESCR is severely penalized.

Example III teaches that although increasing the chromium level on the catalyst seemed to help the swell for the

TABLE II

| Run | 201 | 202 | 203 | 204 | 205 | 206 | 207 |
|---|---|---|---|---|---|---|---|
| Production Data | | | | | | | |
| Catalyst Type | A | A | B | B | B | B | B |
| Activation Temperature, ° F. | 1450 | 1450 | 1100 | 1100 | 1100 | 1100 | 1100 |
| Cocatalyst | None | None | TEB | TEB | TEB | TEB | TEB |
| Cocatalyst Concentration, ppm | 0 | 0 | 1 | 1 | 1 | 1 | 1 |
| Productivity, g pol/g cat/hr | 1887 | 2222 | 5000 | 5556 | 5000 | 4167 | 4545 |
| Reactor Temperature, ° F. | 217 | 218 | 211 | 213 | 214 | 216 | 218 |
| Ethylene, mol % | 10.03 | 13.83 | 10.30 | 9.90 | 9.50 | 9.10 | 10.00 |
| Resin Data | | | | | | | |
| HLMI, g/10 mins | 37.56 | 31.53 | 19.8 | 11.07 | 12.76 | 12.46 | 11.5 |
| HLMI/MI | 92 | 102 | 141 | 185 | 182 | 178 | 230 |
| Density, g/cc | 0.954 | 0.9551 | 0.9512 | 0.9532 | 0.9545 | 0.953 | 0.954 |
| $M_w$ (× $10^{-3}$) | 158.18 | 128.71 | 203.90 | 189.61 | 236.59 | 174.86 | 210.04 |
| $M_n$ (× $10^{-3}$) | 15.28 | 16.30 | 8.60 | 9.70 | 11.0 | 10.10 | 9.10 |
| $M_w/M_n$ | 10.35 | 7.86 | 23.47 | 19.44 | 21.49 | 17.15 | 23.01 |
| Ea, kJ/mol | 34.15 | 33.95 | 34.11 | 35.89 | 35.39 | 36.69 | 36.21 |
| ESCR, hours | 42 | 64 | >1000 | >1000 | 594 | 726 | 428 |
| ESCR - modified B, hours | <24 | <24 | 411 | 127 | 104 | 87 | 87 |
| Onset of Melt Fracture | | | | | | | |
| Shear Rate, $sec^{-1}$ | 2437 | 2418 | 2348 | 2298 | 2313 | 2350 | 2227 |
| Die Pressure, psi | 1460 | 1590 | 1390 | 1480 | 1490 | 1540 | 1500 |
| Blow Molding Data | | | | | | | |
| Weight Swell, % | 445 | 405 | 368 | 321 | 328 | 327 | 313 |
| Die Swell, % | 44.6 | 46.7 | 42.3 | 36.7 | 37.3 | 36.5 | 39 |
| Head Press., psi | 5290 | 5410 | 5080 | 5350 | 5510 | 5490 | 5650 |
| Shear Rate, $sec^{-1}$ | 26145 | 21736 | 13278 | 12063 | 14749 | 13928 | 13565 |
| Die Gap, inches | 0.0153 | 0.0168 | 0.0173 | 0.0196 | 0.0190 | 0.0190 | 0.0199 |
| Cycle Time, sec | 15.7 | 15.7 | 24.5 | 15.3 | 14.9 | 15.2 | 15.0 |
| Subjective Blow Molding Observations 1 to 5 (1 = good, 5 = poor) | | | | | | | |
| Smoke | 2 | 2 | 3 | 3 | 3 | 3 | 3 |
| Surface | 3 | 2 | 3 | 3 | 3 | 3 | 3 |
| Ease of Processing | 2 | 2 | 3 | 2 | 2 | 2 | 2 |
| Odor | 3 | 2 | 2 | 2 | 2 | 2 | 2 |
| Bottle Properties | | | | | | | |
| ESCR, hours | | 134 | | | | | 569 |
| Dart Impact, ft | | 7.2 | | | | | 4.6 |

Catalyst:
A is 1% Cr on Grade 952 Silica; (Surface area = 280 $m^2/g$; pore volume = 1.5 cc/g, 0% Ti)
B is 1% Cr on Sylopore silica-titania (Surface area = 340 $m^2/g$; pore volume = 1.0 cc/g, 3.5 wt % Ti)

Example 3

Table III in Example III lists three resins which demonstrate the importance of the pore volume and surface area of the catalyst system. These resins were made at similar reactor conditions, with the same level of cocatalyst, at the same activation temperature, with the same level of titania, and at similar HLMI and density. Only the surface area and pore volume of the silica-titania catalyst system were different; they were considerably higher. Because of the difference, the die swell and weight swell of the resins were much higher and thus do not qualify as "easy processing resins." This happened even though the catalyst system contained higher levels of chromium than ordinary, in an attempt to minimize both weight and die swell.

This example also shows the effect of substituting triethylaluminum (TEA) as cocatalyst in place of TEB. Notice that invention resins, it does not improve weight swell or die swell of resins made with high porosity catalysts.

TABLE III

| Run | 301 | 302 | 303 |
|---|---|---|---|
| Production Data | | | |
| Catalyst Type | 2% Cr Magnapore | 2% Cr Magnapore | 1% Cr Magnapore-HT |
| Ti, wt % | 2.5 | 2.5 | 5.0 |
| Surface Area, $m^2$g | 550 | 550 | 550 |
| Pore Volume, ml/g | 2.42 | 2.42 | 2.26 |
| Activation Temperature, ° F. | 1100 | 1100 | 1000 |
| Cocatalyst | TEA | TEB | TEB |

TABLE III-continued

| Run | 301 | 302 | 303 |
|---|---|---|---|
| Cocatalyst Concentration, ppm | 2.0 | 2.0 | 2.0 |
| Productivity, g pol/g cat/hr | 4167 | 5882 | 3226 |
| Reactor Temperature, °F. | 219 | 208 | 210 |
| Ethylene, mol % | 7.8 | 10.0 | 7.4 |
| Resin Data | | | |
| HLMI, g/10 mins | 17 | 17.2 | 28.7 |
| HLMI/MI | 113.3 | 191 | 168.8 |
| Density, g/cc | 0.9533 | 0.9559 | 0.9562 |
| $M_w$ (× $10^{-3}$) | 263 | 184.3 | 234.1 |
| $M_n$ (× $10^{-3}$) | 10.9 | 8.6 | 7.26 |
| Mw/Mn | 24 | 21.4 | 32.2 |
| Ea, kJ/mol | 33.76 | 35 | 34.3 |
| ESCR-A, hours | 400 | >1000 | >1000 |
| ESCR-modified B, hours | 85 | 144 | 233 |
| Onset of Melt Fracture | | | |
| Shear Rate, $sec^{-1}$ | 1031 | 2234 | 2293 |
| Die Pressure, psi | 1330 | 1420 | 1290 |
| Blow Molding Data | | | |
| Weight Swell, % | 325 | 414 | 399 |
| Die Swell, % | 45.1 | 44.9 | 43.9 |
| Head Press, psi | 5500 | 5790 | 5470 |
| Shear Rate, $sec^{-1}$ | 15654 | 20771 | 20595 |
| Die Gap, inches | 0.0195 | 0.0162 | 0.0157 |
| Cycle Time, sec | 15.3 | 14.9 | — |
| Subjective Blow Molding Observations 1 to 5 (1 = good, 5 = poor) | | | |
| Smoke | 2 | 3 | 3 |
| Surface | 2 | 2 | 2 |
| Ease of Processing | 2 | 3 | 4 |
| Odor | 2 | 3 | 4 |
| Bottle Properties | | | |
| ESCR, hours | >700 | >700 | 287 |
| Dart Impact, ft | 7.5 | 4.0 | 11.0 |

Example 4

This example shows the effect of using a silica catalyst in place of the prescribed silica-titania catalyst. Otherwise, all the other prescribed production conditions are met by these runs. A TEB cocatalyst is used along with low activation temperature, and even higher chromium in Run 401.

Run 401 was made with a high porosity silica-supported catalyst, displaying high pore volume and high surface area. Run 401 exhibits high weight swell and high die swell. Thus, Run 401 does not qualify as an easy processing resin.

Run 402 was made with a lower porosity silica-supported catalyst system containing no titanium. This time both die swell and weight swell showed improvement, although not to the same degree Runs 101, 201, and 202. However, the breadth of the $M_w/M_n$ distribution was not as broad as when the catalyst was a silica-titania support instead of a silica support. Most importantly, however, was a decline in ESCR compared to Runs 101, 201, and 202. Thus, Runs 401 and 402, do not qualify in every respect to the requirements of an easy processing resin.

TABLE IV

| Run | 401 | 402 |
|---|---|---|
| Production Data | | |
| Catalyst Type | 2% Cr on HPVSA Silica | 1% Cr on Grade 952 Silica |
| Surface Area, $m^2$/g | 577 | 300 |
| Pore Volume, ml/g | 2.21 | 1.50 |
| Activation Temperature, °F. | 1000 | 1200 |
| Cocatalyst | TEB | TEB |
| Cocatalyst Concentration, ppm | 2.0 | 2.0 |
| Productivity, g pol/g cat/hr | 7692 | 5556 |
| Reactor Temperature, °F. | 218 | 220 |
| Ethylene, mol % | 9.8 | 6.7 |
| Resin Data | | |
| HLMI, g/10 mins | 20.7 | 13.6 |
| HLMI/MI | 138 | 227 |
| Density, g/cc | 0.9539 | 0.9546 |
| $M_w$ (× $10^{-3}$) | 202 | 207.3 |
| $M_n$ (× $10^{-3}$) | 11.5 | 14.3 |
| Mw/Mn | 17.5 | 14.4 |
| Ea, kJ/mol | 34.4 | 37.71 |
| ESCR-A, hours | 395 | 234 |
| ESCR-modified B, hours | 90 | 44 |
| Onset of Melt Fracture | | |
| Shear Rate, $sec^{-1}$ | 2455 | 2268 |
| Die Pressure, psi | ? | ? |
| Blow Molding Data | | |
| Weight Swell, % | 401 | 314 |
| Die Swell, % | 42.3 | 38.0 |
| Head Press, psi | 3350 | 5410 |
| Shear Rate, $sec^{-1}$ | 18604 | 13572 |
| Die Gap, inches | 0.0167 | 0.0208 |
| Cycle Time, sec | 15.4 | 15.3 |
| Subjective Blow Molding Observations 1 to 5 (1 = good, 5 = poor) | | |
| Smoke | 2 | 2 |
| Surface | 3 | 2 |
| Ease of Processing | 2 | 2 |
| Odor | 2 | 2 |
| Bottle Properties | | |
| ESCR, hours | nt | 443 |
| Dart Impact, ft | nt | 3.4 |

Examples 5 and 6

Finally, Runs in Examples V and VI show the necessity of using a low activation temperature, and also of using TEB cocatalyst. In Example V the catalyst systems had the correct silica-titania composition and the correct porosity, but they were activated at temperatures higher than in accordance with this invention. The catalyst support used in Run 501 was 5 wt % titania and the support used in Run 502 was 2 wt % titania. Notice that ESCR was not much improved over the standard blow molding resin, shown in Run 503. This also is evident in Example VI which shows a series of Runs made with the inventive catalyst system but activated at temperatures ranging from 1100° F. up to 1400° F. Notice the strong dependence of ESCR on activation temperature. As prescribed, 1100° F. appears to be far preferable to other activation/calcination temperatures.

These two examples also show the effect of leaving out cocatalyst. In all Runs the right catalyst system was used, but no TEB was added to the reactor. Notice that the die swell, as measured this time in Example V by layflat, is not improved over the standard resin, Run 102. Example VI lists the calculated die swell. Notice that at the preferred 1100° F. activation temperature, the die swell is actually much worse than the standard blow molding resin, Run 605. Notice also that in both examples none of the resins exhibit sufficiently high melt strength, as indicated by HLMI/MI, and that ESCR does not really equal that of the invention Runs. Thus, the TEB cocatalyst is considered to be an essential part of the invention.

TABLE V

| Run | 501 | 502 | 503 |
|---|---|---|---|
| Catalyst | Sylopore | Sylopore | 969ms |
| Ti, wt % | 5.0 | 2.5 | 0 |
| Activation Temperature, ° F. | 1300 | 1500 | 1400 |
| TEB, ppm | 0 | 0 | 0 |
| Reactor Temperature, ° F. | 214 | 213 | 217 |
| HLMI, g/10 mins | 41.4 | 25.8 | 35 |
| HLMI/MI | 115 | 136 | 105 |
| Density, g/cc | 0.955 | 0.954 | 0.955 |
| Productivity, g pol/g cat/hr | 3280 | 2530 | 2500 |
| ESCR-A, hours | 180 | 134 | 100 |
| Bottle ESCR, hours | 135 | 130 | 100 |
| Bottle Impact, ft | 8 | 6 | 7 |
| Die Swell (Layflat), % | 5.44 | 5.35 | 5.45 |
| Smoke | 1 | 3 | 1 |
| Ease of Processing | 1 | 2 | 1 |

TABLE VI

| Run | 601 | 602 | 603 | 604 | 605 |
|---|---|---|---|---|---|
| Catalyst | Sylopore | Sylopore | Sylopore | Sylopore | 969 MS |
| Ti, wt % | 2.5 | 2.5 | 2.5 | 2.5 | 0 |
| Activation Temperature, ° F. | 1100 | 1200 | 1300 | 1400 | 1400 |
| TEB, ppm | 0 | 0 | 0 | 0 | 0 |
| Reactor Temperature, ° F. | 228 | 228 | 219 | 226 | 217 |
| HLMI, g/10 mins | 38.1 | 45.3 | 30.5 | 41.6 | 33.4 |
| HLMI/MI | 61.7 | 70.4 | 91.5 | 87 | 93 |
| Density, g/cc | 0.950 | 0.9581 | 0.956 | 0.9615 | 0.955 |
| Productivity, g pol/g cat/hrs | 1613 | 2174 | 2381 | 6250 | 2500 |
| ESCR-A, hours | 309 | 78 | 116 | 36 | 85 |
| Bottle ESCR, hours | >700 | 110 | 300 | 76 | 205 |
| Bottle Impact, ft | >12 | 11.5 | 11.5 | 6.5 | >12 |
| Die Swell, % | 50.8 | 44.0 | 37.5 | 41.2 | 38.0 |
| Die Gap, inches (wt swell) | na | 0.025 | 0.025 | 0.0214 | 0.0197 |
| Smoke | 2 | 2 | 2 | 2 | 2 |
| Ease of Processing | 3 | 2 | 3 | 2 | 2 |

While this invention has been described in detail for the purpose of illustration, it is not to be construed or limited thereby. This detailed description is intended to cover all changes and modifications within the spirit and scope thereof.

That which is claimed is:

1. A composition comprising a copolymer formed from ethylene and a mono-1-olefin; wherein the mono-1-olefin has from about 3 to about 8 carbon atoms per molecule; and wherein the copolymer has a high load melt index (HLMI) within a range of about 10 to about 80 g/10 minutes, a density within a range of about 0.95 to 0.96 g/cc, a shear response (HLMI/MI) within a range of about 100 to about 250, a weight swell lower than about 380%, a die swell lower than about 43%, an ESCR greater than about 200 hours, a $M_w/M_n$ greater than about 12 and the onset of melt fracture greater than about 2000 sec$^{-1}$.

2. The composition of claim 1, wherein the mono-1-olefin is 1-hexene.

3. The composition of claim 1, wherein the high load melt index is within a range of 13 to 40 grams/10 minutes.

4. A The composition of claim 1, wherein the shear response (HLMI/MI) is within a range of 125 to 175.

5. The composition of claim 1, wherein the copolymer has a $M_w/M_n$ greater than about 14.

6. The composition of claim 1, wherein the copolymer has a $M_w/M_n$ greater than about 18.

7. The composition of claim 1, wherein the copolymer has a $M_w/M_n$ greater than about 20.

8. A composition comprising a copolymer formed from ethylene and 1-hexene, wherein the copolymer has a high load melt index (HLMI) within a range of 15 to 30 g/10 minutes, a density within a range of 0.954 to 0.956 g/cc, a shear response (HLMI/MI) within a range of 125 to 175, a weight swell lower than about 330%, a die swell lower than about 38%, an ESCR, condition A, greater than about 1000 hours, a $M_w/M_n$ within a range of 15 to 22, and the onset of melt fracture greater than about 2300 sec$^{-1}$.

9. A composition comprising a copolymer formed from ethylene and a mono-1-olefin; wherein the mono-1-olefin has from 3 to about 8 carbon atoms per molecule; and wherein the copolymer has a $M_w/M_n$ greater than about 14; a density within the range of about 0.95 to about 0.96 g/cc; a weight swell lower than about 380%; a die swell lower than about 43%; and an ESCR of greater than about 200 hours.

10. The composition of claim 9, wherein the copolymer has a $M_w/M_n$ greater than about 18.

11. The composition of claim 9, wherein the copolymer has a $M_w/M_n$ greater than about 20.

* * * * *